United States Patent [19]

Nyi et al.

[11] 4,001,304

[45] Jan. 4, 1977

[54] ACRYLIC ACID ESTERS

[75] Inventors: Kayson Nyi, Sellersville; Sandra I. Graham, North Wales, both of Pa.

[73] Assignee: Rohm and Haas Company, Philadelphia, Pa.

[22] Filed: May 2, 1974

[21] Appl. No.: 466,353

[52] U.S. Cl. .............................. 260/486 R; 106/19; 204/159.23; 252/188.3 R; 260/465.4; 260/584 B; 426/458; 526/312; 526/311; 526/304
[51] Int. Cl.² ........................................ C07C 69/54
[58] Field of Search .............................. 260/486 R

[56] References Cited

UNITED STATES PATENTS

| | | | |
|---|---|---|---|
| 2,103,265 | 12/1937 | Lott | 260/486 R |
| 2,677,699 | 5/1954 | Barney | 260/486 R |
| 2,737,452 | 3/1956 | Catlin et al. | 260/486 R |
| 2,834,765 | 5/1958 | DeBenneville | 260/486 R |

*Primary Examiner*—Paul J. Killos

[57] ABSTRACT

N-Substituted acryloyloxyethyl amines are useful both as radiation curable coating materials and as cure accelerators in coating formulations. The amines are prepared by one of several methods including transesterification of acrylate esters with an N-substituted hydroxyethylamine or acrylation of the N-substituted hydroxyethylamine.

3 Claims, No Drawings

ACRYLIC ACID ESTERS

This invention relates to novel compounds which accelerate the cure of various classes of known photopolymerizable monomers. In addition, the novel compounds of this invention can be employed by themselves as photopolymerizable monomers.

Radiation curable coating compositions are well-known in the art. Due to restrictions on the amount of solvent permitted in the atmosphere and because the energy crisis is forcing industry to find the most efficient systems available, the search has continued for a 100 percent polymerizable system, that is, compositions which have no volatile components but contain diluents which react to become either the cured film or part of the cured film. Such types of monomers are known; for example, the polyacrylates, methacrylates and itaconates of pentaerythritol polyethers disclosed in U.S. Pat. Nos. 3,551,235; 3,551,246; 3,551,311; 3,552,986; 3,558,387 and 3,661,614. To increase the speed of photopolymerization, compounds known as cure accelerators have been employed such as those disclosed in U.S. Pat. Nos. 3,551,246; 3,551,311; 3,552,986 and 3,759,807. However, these cure accelerators are not 100 percent polymerizable.

This invention relates to compounds which are 100 percent polymerizable, which cure very rapidly and which also are accelerators for the known photopolymerizable monomers. The compounds of this invention have the following structural formula:

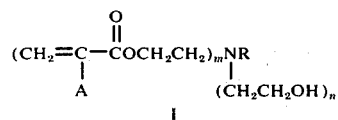

I

A is hydrogen or methyl; R is alkyl, for example, lower alkyl such as methyl, ethyl, propyl, butyl, pentyl and the like; cycloalkyl, for example, cyclo lower alkyl such as cyclopentyl, cyclohexyl and the like substituted alkyl, for example, substituted lower alkyl such as substituted ethyl radical of the formula $-CH_2CH_2X$ wherein X is cyano, hydroxy, nitro, or a radical of the formula $CO_2R^1$, $COR^1$, $CONH_2$, $CONHR^1$ or $CONR^1_2$ wherein $R^1$ is alkyl, for example, lower alkyl such as methyl, ethyl, n-propyl, n-butyl, tert-butyl, pentyl and the like; m is a number having a value of 1 to 2 and n is a number having a value of 0 to 1.

When employed as an accelerator, the radiation curable compositions comprise from about 5 to about 80 percent by weight of an N-substituted acryloyloxyethylamine (I, supra) and from about 20 to about 95 percent of a photopolymerizable polyfunctional ethylenically unsaturated compound.

The preferred compositions of this invention comprise from about 5 to about 30 percent of an N-substituted acryloyloxyethylamine (I) and from about 70 to about 95 percent by weight of at least one ester of an ethylenically unsaturated acid of pentaerythritol, dipentaerythritol, dipentaerythritol, polypentaerythritol, trimethylolpropane, ethylene glycol or neopentyl glycol. The preferred esters are the acrylate, methacrylate and itaconate esters. Specific examples include, but are not limited to, trimethylolpropane triacrylate, pentaerythritol diacrylate, pentaerythritol triacrylate, dipentaerythritol triacrylate, pentaerythritol tetraacrylate, dipentaerythritol diacrylate, dipentaerythritol tetraacrylate, dipentaerythritol pentaacrylate, dipentaerythritol hexacrylate, tripentaerythritol octacrylate and the like; prepolymers of these esters, for example, dimers, trimers and other oligomers and mixtures and copolymers thereof, as well as mixtures of the monomers and prepolymers. The above described esters may be obtained by one of several methods including ester interchange which comprises interacting an ester of the acid and a suitable volatile alcohol with a polyhydric alcohol in the presence of a suitable catalyst or the esters may be prepared by the direct reaction of a polyhydric alcohol with acrylic acid or an acrylyl halide.

Before exposing the coatings containing the N-substituted acryloyloxyethylamine (I, supra) and compositions described above to actinic energy there is added a photoinitiator. The photoinitiators or sensitizers are used in amounts of from about 1 to 25% by weight, and preferably from about 2% to 15% by weight of the total polymerizable composition. Preferred photoinitiators include acyloins and derivatives thereof, for example, benzoin alkyl ethers such as benzoin methyl ether, benzoin ethyl ether and the like, desyl halides such as desyl bromide, desyl chloride and the like, desyl amine, benzophenone derivatives, polychlorinated aromatic compounds and mixtures thereof.

Any suitable source of actinic energy may be used, for example, a 2400 watt, medium-pressure, mercury arc source. Factors varying the rate at which a photopolymerizable composition will dry include the specific ingredients in the composition, concentration of the photoinitiators, thickness of the material, nature and intensity of the radiation source and its distance from the material, the presence or absence of oxygen and the ambient temperature. The compositions of the present invention may be used in relatively thick layers or may be used as thin films having the thickness of from about 0.5 to 150 micons, and preferably from about 1 to 10 microns.

The N-substituted acryloyloxyethylamines (I) are prepared by one of several methods including:

a. the transesterification of a lower alkyl acrylate such as methyl acrylate, ethyl acrylate, methyl methacrylate ethyl methacrylate and the like with an N-substituted bis(hydroxyethylamine) (II) or b. acrylation of an N-substituted bis(hydroxyethylamine)(II, infra) with an acryloyl halide such as acryloyl chloride and the like or acrylic acid anhydride. The following equation illustrates this process:

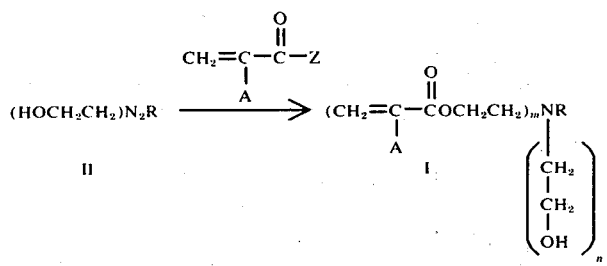

wherein A, R, m and n are as defined above and Z is halo such as chloro and the like, lower alkoxy such as methoxy, ethoxy and the like or acryloyloxy.

The N-substituted bis(hydroxyethylamines)(II, supra) employed above are prepared by either of two methods depending upon what R group is desired. One method comprises treating diethanolamine (III) with a substituted vinyl (IV). This reaction is conveniently conducted in the absence of solvents at a temperature in the range of from about 20° to 100° C. The following equation illustrates this process:

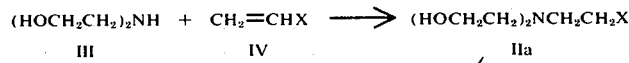

wherein X is as defined above.

By employing the following substituted vinyl compounds (IV, supra) acrylonitrile, ethyl acrylate, methylvinyl ketone, acrylamide, methyl acrylate, butyl acrylate and 2-ethylhexyl acrylate and reacting each with diethanolamine, there is obtained the corresponding N-substituted N,N-bis(hydroxyethylamine) (II, supra), which when treated with a compound of the formula

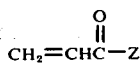

wherein Z is as defined above, there is obtained, respectively, the following N-substituted N,N-bis(acryloyloxyethylamines) (I, supra): N,N-bis(acryloyloxyethyl)-3-aminopropionitrile; ethyl N,N-bis(acryloyloxyethyl)-3-aminopropionate; n-butyl N,N-bis-(acryloyloxyethyl)-3-aminopropionate; methyl N,N-bis(acryloyloxyethyl)-3-amino propionate; N,N-bis(acryloyloxyethyl)-4-amino-butan-2-one, and N,N-bis(acryloyloxyethyl)-3-aminopropionamide.

A second method for preparing those N-substituted N,N-bis(hydroxyethyl amines) wherein R is alkyl or substituted alkyl or cycloalkyl comprises ethoxylation of a primary amine as illustrated by the following equation:

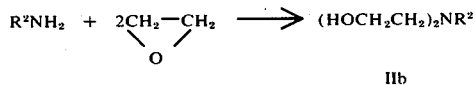

wherein $R^2$ is alkyl, substituted alkyl or cycloalkyl.

The photopolymerizable compositions of the present invention are suitable as adhesives particularly in the laminating art; as coatings for metals, plastics, textiles, paper and glass; as markers for roads, parking lots, airfields and similar surfaces; as vehicles for printing inks, lacquers, and paint; and in the preparation of photopolymerizable elements, i.e., a support having disposed thereon a photopolymerizable layer of a composition as described herein. Moreover, various dyestuffs, pigments, plasticizers, lubricants and other modifiers may be incorporated to obtain certain desired characteristics in the finished products.

When a photopolymerizable composition of the present invention is used as an adhesive, at least one of the lamina must be translucent when ultraviolet light is used. When the radiation source is an electron beam or gamma radiation at least one of the lamina must be capable of transmitting high energy electrons or gamma radiation, respectively, and neither is necessarily translucent to light. Typical laminations include polymer-coated cellophane to polymer-coated cellophane films, treated polyethylene to treated polyethylene films, Mylar to a metal substrate such as copper, opaque oriented polypropylene to aluminum, polymer-coated cellophane to polypropylene and the like.

The photopolymerizable compositions of the present invention may be utilized for metal coatings and particularly for metals which are to be subsequently printed. Glass and plastics may also be coated, and the coatings are conventionally applied by roller or spray. Pigmented coating systems may be used for various polyester and vinyl films; polymer-coated cellophane; glass; treated and untreated polyethylene, for example, in the form of disposable cups or bottles; and the like. Examples of metals which may be coated include sized and unsized tin plate.

The compositions may be pigmented with organic or inorganic pigments, for example, molybdate orange, titanium white, chrome yellow, phthalocyanine blue, and carbon black, as well as colored with dyes. Stock which may be printed includes paper, clay-coated paper and boxboard. In addition, the compositions of the present invention are suitable for the treatment of textiles, both natural and synthetic, for example, in vehicles for textile printing inks or for specialized treatments of fabrics to produce water repellency, oil and stain resistance, crease resistance and the like. A typical ink formulation would be 77% resin, 3% photoinitiator and 20% pigment.

Photopolymerizable elements of this invention comprise a support, for example, a sheet or plate, having superimposed thereon a layer of the above-described photopolymerizable compositions. Suitable base or support materials include metals, for example, steel and aluminum plates, sheets, and foils, and films or plates composed of various film-forming synthetic resins or high polymers, such as addition polymers, and in particular, vinyl polymers, for example, vinyl chloride polymers; vinylidene chloride polymers; vinylidene chloride copolymers with vinyl chloride, vinyl acetate or acrylonitrile; and vinyl chloride copolymers with vinyl acetate or acrylonitrile; linear condensation polymers such as polyesters, for example, polyethylene terephthalate; polyamides, and the like. Fillers or reinforcing agents can be present in the synthetic resin or polymer bases. In addition, highly reflective bases may be treated to absorb ultraviolet light or a light-absorptive layer can be transposed between the base and photopolymerizable layer.

Photopolymerizable elements can be made by exposing to ultraviolet light selected portions of the photopolymerizable layer thereof until addition polymerization is completed to the desired depth in the exposed portions. The unexposed portions of the layer are then removed, for example, by use of solvents which dissolve the monomer or prepolymer but not the polymer.

The invention is illustrated in the following examples, but is not intended to be limited thereto.

EXAMPLE 1

3-[N,N-Bis(acryloyloxyethylamino)]propionitrile Step A - 3-[N,N-Bis(hydroxyethylamino)]propionitrile To a one liter, four-necked, round bottomed flask fitted with a thermometer and a "Therm-O-Watch", and ice bath atop a pot-lifter, a pressure equalizing addition funnel, a mechanical stirrer and a reflux condenser is added dry diethanolamine (503 g., 1.79 moles). Acrylonitrile (254 g., 4.79 moles) is added dropwise over a one hour period. The temperature of the slightly exothermic reaction is moderated with an ice bath and kept between 40°–45° C. Upon completion of the addition, the reaction temperature is allowed to reach 50° C., and then cooled to ambient temperature (ca. 1.5 hour) to afford 3-[N,N-bis(acryloyloxyethylamino)]propionitrile, a clear, slightly yellow liquid (757 g.), Brookfield Viscosity = 140–150 centipoise (LV No. 2 spindle, 30 rpm). Infrared analysis of the product shows the conjugated CN band ($\gamma 2240$ cm) is replaced by unconjugated CN ($\gamma 2260$ cm). Nmr analysis shows the absence of vinyl protons, indicating greater than a 95% reaction.

STEP B

3-[N,N-Bis(acryloyloxyethylamino)]propionitrile

A two-liter, four-necked, round bottomed flask is fitted with a thermometer, a "Therm-O-Watch", an air ebullator, an oil bath stop a pot-lifter, a 15 plate Oldershaw Column fitted with a variable take-off distillation head, a 500 ml. pressure equalizing addition funnel, and a mechanical stirrer. The flask is charged with 3-(N,N-bis(hydroxyethylamino)propionitrile (415.0 g., 5.24 eq. of OH), ethyl acrylate (786 g., 7.78 mole, 1.5 eq./eq. of OH), di-n-butyl tin oxide catalyst (6.52 g., 0.026 eq., 0.5 eq. % on OH) and MEHQ inhibitor (1.05 g., 0.1 wt. % on total EA to be charged).

Air ebullition is begun and the reaction mixture is heated to reflux (water, presumably from wet EA, is immediately collected and discarded). As the reaction progresses, ethanol is formed causing the vapor temperature to fall below 80° C.; the reaction mixture becomes homogenous. Distillation is begun at a rate such that the vapor temperature is kept below 80° C. while the volume of the reaction mixture is kept constant by the gradual addition of ethyl acrylate (263 g., 2.63 moles). After 10 hours, glc analysis shows the distillate to contain 213 g. (88.3% conversion of ethanol). At this point, the pot temperature has risen to 115° C. and the vapor temperature to 85° C. (slowing the rate of distillation failed to depress the vapor temperature indicating that ethanol formation has ceased). The distillation head and Oldershaw Column are replaced with a straightlead distillation head. The apparatus is fitted with a steam inlet tube. An additional 0.5 g. of MEHQ is added to the reaction mixture and the excess ethyl acrylate is removed by steam distillation. An azeotrope composed of 85/15//EA/water is collected. Steam distillation is stopped when the EA component of the distillate is no longer discernible (pot temperature 95° C.). The residual water is distilled at reduced pressure (20 mm) at a maximum pot temperature of 100° C. The product, 3-(N,N-bis[acryloyloxyethylamino)]propionitrile (629.2 g., 95% yield, M=1.76, n-0.24) is isolated as a clear, light yellow liquid. EA content = 30–500 ppm, water content = 0.1%, viscosity = 48 centipoise and Br No. = 118.

EXAMPLE 2

Ethyl 3-[N,N-Bis(acryloyloxyethylamino)]propionate

Step A - Ethyl 3-[N,N-bis(hydroxyethylamino)]propionate

By substituting for the acrylonitrile of Example 1, Step A, an equimolar quantity of ethyl acrylate and by following substantially the procedure described therein, there is obtained ethyl 3-[N,N-bis(hydroxyethylamino)]propionate. Viscosity = 90 centipoise; hydroxy number = 897 observed/850 theoretical.

STEP B

Ethyl 3-[N,N-bis(acryloyloxyethylamino)]propionate

By substituting for the 3-[N,N-bis(hydroxyethylamino)]propionitrile of Example 1, Step B, an equimolar quantity of ethyl 3-[N,N-bis(hydroxyethylamino)]propionate and by following substantially the procedure described therein, there is obtained ethyl 3-[N,N-bis(acryloyloxyethylamino)]propionate. Viscosity = 80 centipoise, bromine number = 97.7.

EXAMPLE 3

3-[N,N-Bis(acryloyloxyethylamino)]propionamide

Step A -
3-[N,N-bis(hydroxyethylamino)]propionamide

To a one-liter, four-necked, round bottomed flask fitted with a mechanical stirrer, a thermometer, a "Therm-O-Watch" and a condenser is added diethanolamine (472.5 g., 4.5 moles) and acrylamide (319.5 grams, 4.5 moles). The mixture is heated to 60° C. whereupon the contents become homogenous. At this point, a moderate exothermic reaction occurs which raises the reaction temperture to 100° C. The product, 3-[N,N-bis(hydroxyethylamino)]propionamide, is cooled and used in the following step without further purification.

STEP B -
3-[N,N-bis(acryloyloxyethylamino)]propionamide

By substituting for the 3-[N,N-bis(hydroxyethylamino)]propionitrile of Example 1, Step B, an equimolar quantity of 3-[N,N-bis(hydroxyethylamino)]propionamide and by following substantially the procedure described therein, there is obtained 3-[N,N-bis(acryloyloxyethylamino)]propionamide.

EXAMPLE 4

4-[N,N-Bis(acryloyloxyethylamino)]butan-2-one

Step A - 4-[N,N-bis(hydroxyethylamino)]butan-2-one

By substituting for the acrylonitrile of Example 1, Step A, an equimolar quantity of methylvinylketone and by following substantially the procedure described therein, there is obtained 4-[N,N-bis(hydroxyethylamino)]butan-2-one.

Step B - 4-[N,N-bis(acryloyloxyethylamino)]butan-2-one

By substituting for the 3-[N,N-bis(hydroxyethylamino)]propionitrile of Example 1, Step B, an equimolar quantity of 4-[N,N-bis(hydroxyethylamino)]butan-2-one and by following substantially the procedure described therein, there is obtained 4-[N,N-bis(acryloyloxyethylamino)]butan-2-one.

The following table, taken together with the equations, illustrates the various starting materials, intermediate and final products which can be prepared and employed as accelerators with other photopolymerizable monomers or employed themselves as photopolymerizable monomers.

head, 500 ml. pressure-equalizing addition funnel and a mechanical stirrer is added dry triethanolamine (50 g., 0.336 mole), dry ethyl acrylate (300 g., 3 moles), hydroquinone monomethyl ether (MEHQ) (0.38 g., 0.13 wt. % on monomer) and dibutyl tin oxide catalyst (1.92 g., 0.008 mole). The reaction mixture is heated to reflux while gentle air ebullition is maintained. As the reaction proceeds, the vapor temperature falls below 80° C.; distillation is begun and maintained at a rate such that the vapor temperature is kept below 80° C. The pot volume is kept approximately constant by the addition of fresh ethyl acrylate. The ethanol content of the distillate is measured by glc analysis. After 11 hours, the total ethanol distilled reaches 0.67 mole (m = 2.0) and the reaction is terminated. The Oldershaw column and distillation head are replaced with a straight-lead distillation head and the excess ethyl acrylate removed under vacuum during which air ebullition is maintained to prevent polymerization. The maximum pot temperature is 100° C. The product is isolated as a clear, liquid, viscosity, 55 centipoise.

Infrared spectrum:
$\gamma$3400–3600 cm-1 (broad, OH)
$\gamma$1740 cm-1 (C=O)
$\gamma$1660 cm-1 (C=C, doublet)

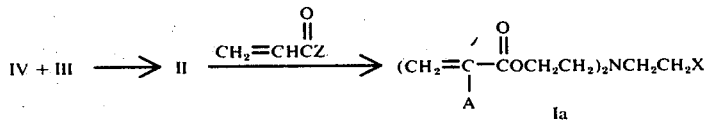

$\gamma$800 cm-1

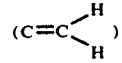

Nmr analysis shows the reaction conversion to be 66% (m = 2.0, n = 0.0).

The following Table II taken together with the following equation illustrates the various starting materials and final products which may be prepared by following substantially the procedure in Example 17:

TABLE I

| Ex. No. | X | Z | A |
|---|---|---|---|
| 5 | —CN | —Cl | —CH$_3$ |
| 6 | —CN | —OCH$_3$ | H |
| 7 | —CO$_2$CH$_3$ | —OC$_2$H$_5$ | —CH$_3$ |
| 8 | —CO$_2$C$_2$H$_5$ | —OCCH=CH$_2$ (O=C) | H |
| 9 | —CO$_2$C$_3$H$_7$ | —OC$_2$H$_5$ | H |
| 10 | —CO$_2$—n—C$_4$H$_9$ | —OC$_2$H$_5$ | H |
| 11 | —COCH$_3$ | —OC$_2$H$_5$ | —CH$_3$ |
| 12 | —COC$_2$H$_5$ | —OC$_2$H$_5$ | —CH$_3$ |
| 13 | —COC$_3$H$_7$ | —OCH$_3$ | H |
| 14 | —NO$_2$ | —Cl | H |
| 15 | —CONHCH$_3$ | —OC$_2$H$_5$ | H |
| 16 | —CON(CH$_3$)$_2$ | —OC$_2$H$_5$ | H |

EXAMPLE 17

N-Hydroxyethyl-N,N-bis(acryloyloxyethyl)amine

To a one liter, four-necked, round bottomed flask equipped with a thermometer, "Therm-O-Watch," air ebullator, oil bath stop a pot lifter, a fifteen plate Oldershaw column fitted with a variable take-off distillation

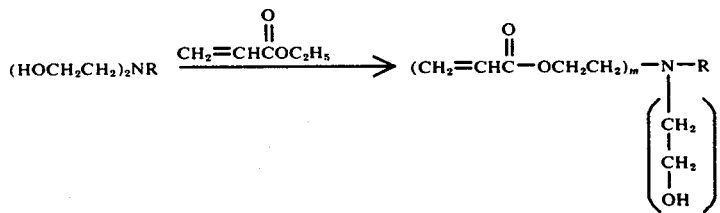

TABLE II

| Ex. No. | R | M | N | Viscosity (Brookfield) |
|---|---|---|---|---|
| 18 | (CH$_3$)$_3$C— | 1.3 | 0.7 | 20 centipoise |
| 19 | (CH$_3$)$_3$C— | 2 | 0 | 25 centipoise |
| 20 | ⟨S⟩— | 1.6 | 0.4 | 40 centipoise |
| 21 | C$_2$H$_5$OCCH$_2$CH$_2$— (O=C) | 1.9 | 0.1 | Not determined |

TABLE II-continued

| Ex. No. | R | M | N | Viscosity (Brookfield) |
|---|---|---|---|---|
| 22 | 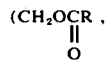 C$_2$H$_5$OCCH$_2$CH$_2$— | 1.55 | 0.45 | Not determined |

The compounds of Examples 17–22 are all liquids of low viscosity. The values for m and n are obtained from nuclear magnetic resonance spectra by the relative areas (integrated) of the proton absorption centered at δ4.3 ppm $$(CH_2OCR, \quad \underset{O}{\overset{\|}{}})$$

triplet) versus the proton absorption centered at δ3.6 ppm (CH$_2$OH). The percent conversion is calculated as follows:

$$\left[\frac{\text{Area at 4.3 ppm}}{\text{Area at 4.3 + area at 3.6 ppm}}\right] \times 2 = m$$

$$2 - m = n$$

The products are further characterized by infrared spectroscopy and show characteristic absorptions at γ 1740 cm$^{-1}$ (carbonyl, ester), 1650 cm$^{-1}$ (doublet, C=C) and 800 cm$^{-1}$

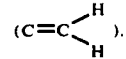

What is claimed is:

1. A compound of the formula:

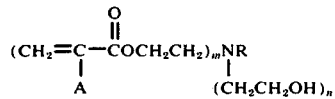

wherein A is hydrogen or methyl; R is a radical of the formula -CH$_2$CH$_2$X wherein X is, hydroxy or nitro; m is a number having a value in the range of 1 to 2 and n is a number having a value in the range of 0 to 1.

2. A compound according to claim 1 wherein A is hydrogen and X is hydroxy.

3. A compound according to claim 1 wherein A is hydrogen; X is hydroxy; m equals 2 and n equals 0.

* * * * *

Disclaimer 4,001,304.—*Kayson Nyi*, Sellersville, and *Sandra I. Graham*, North Wales, Pa. ACRYLIC ACID ESTERS. Patent dated Jan. 4, 1977. Disclaimer filed Feb. 2, 1977, by the assignee, *Rohm and Haas Company*.

Hereby enters this diclaimer to claims 1, 2 and 3 of said patent.

[*Official Gazette March 29, 1977.*]